Feb. 2, 1932.   H. E. LAKE   1,843,566
HEATING SYSTEM
Filed Aug. 2, 1929   3 Sheets-Sheet 3
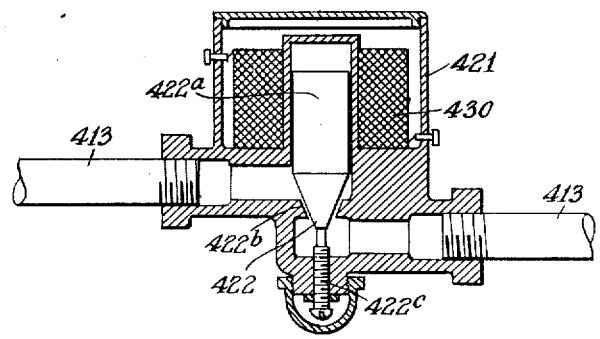
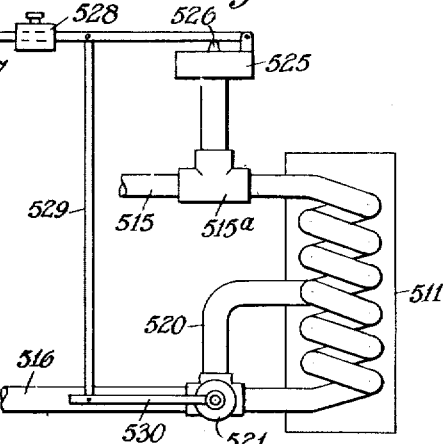
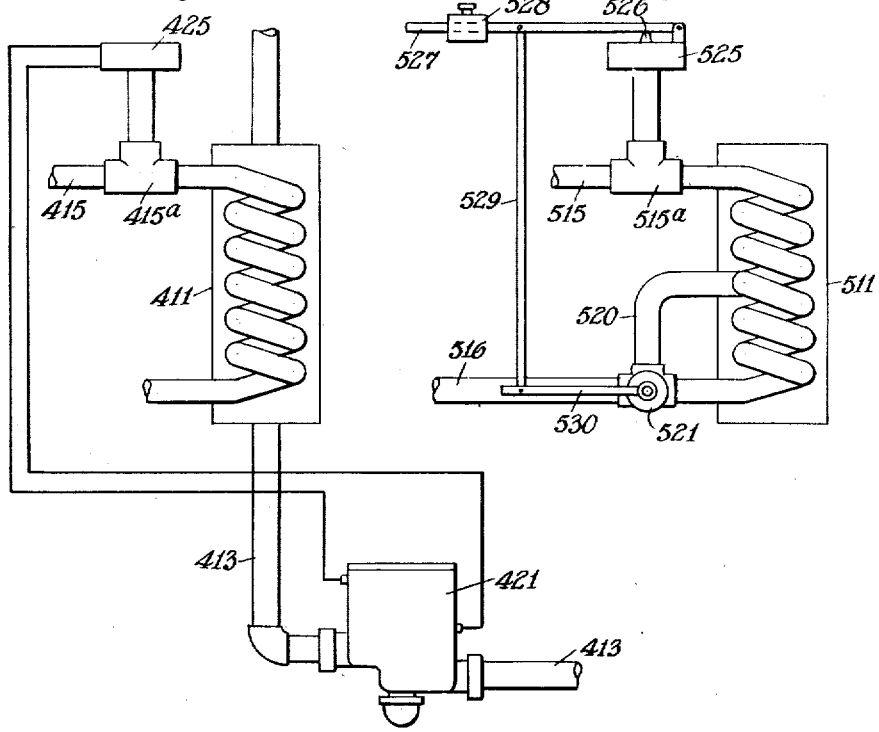

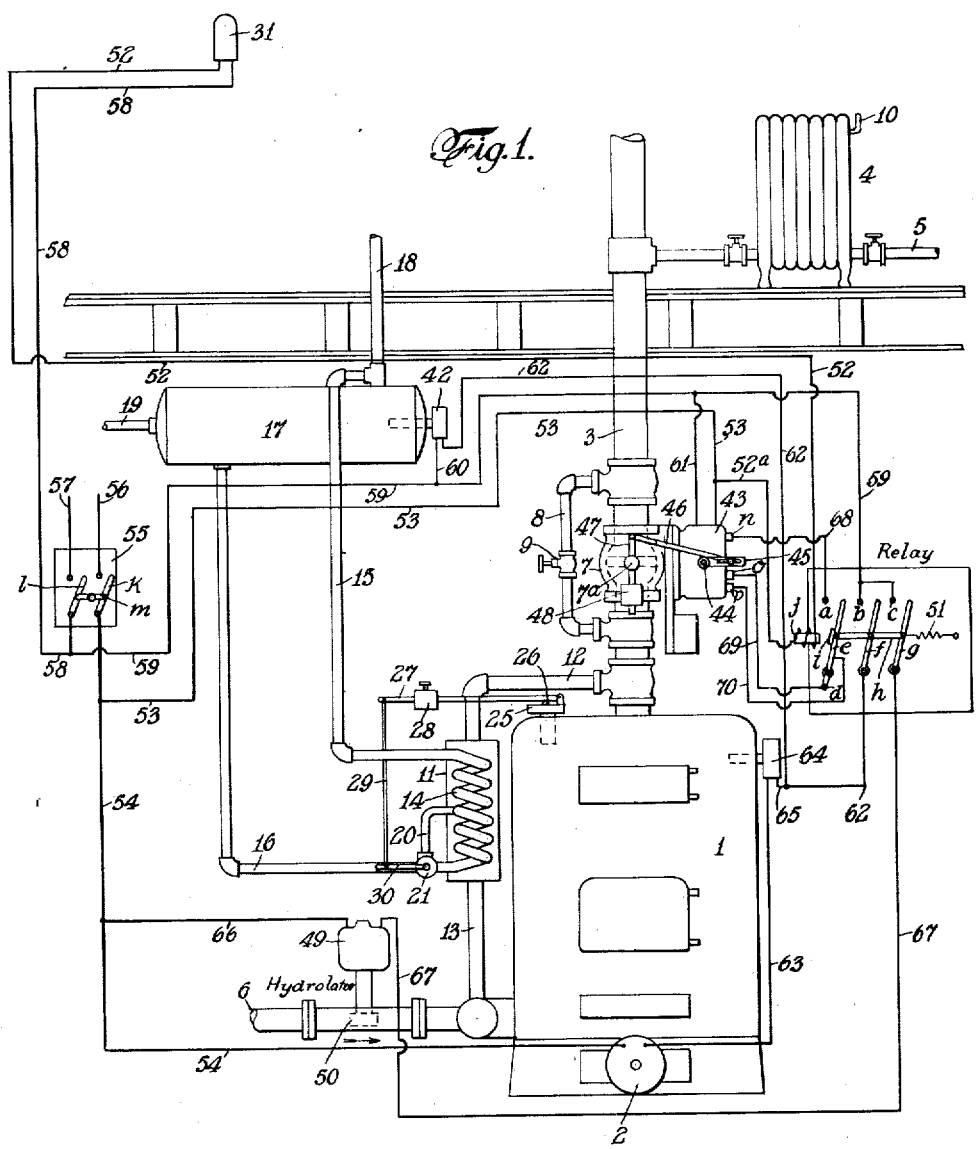

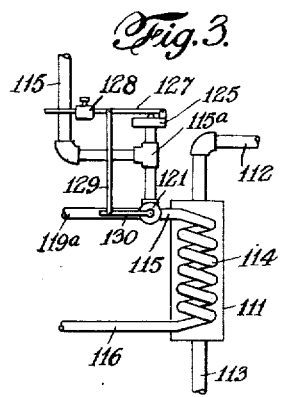
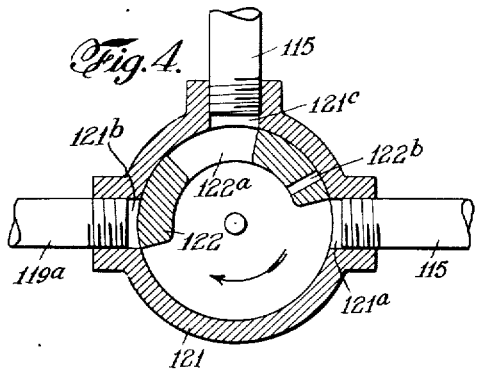
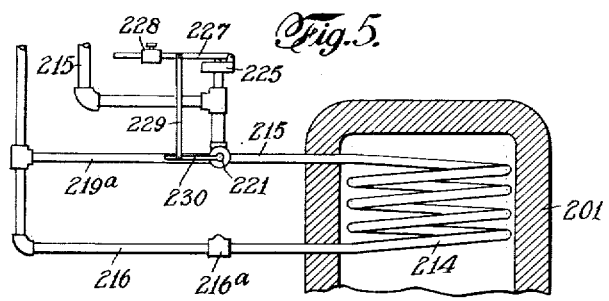
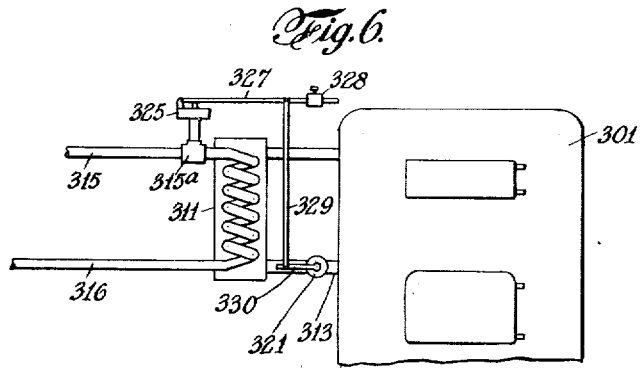

Patented Feb. 2, 1932

1,843,566

UNITED STATES PATENT OFFICE

HARRY E. LAKE, OF NEW YORK, N. Y., ASSIGNOR TO PREFERRED UTILITIES MANUFACTURIES CORPORATION, OF NEW YORK, N. Y., A CORPORATION OF DELAWARE

HEATING SYSTEM

Application filed August 2, 1929. Serial No. 383,009.

My invention consists in the novel features hereinafter described, reference being had to the accompanying drawings which show several embodiments of the invention selected by me for purposes of illustration, and the said invention is fully disclosed in the following description and claims.

My invention has for its object to provide a system, preferably of the hot water type for heating a building and simultaneously maintaining a supply of hot water for domestic or other purposes, in which independent devices are provided for controlling the heating means, one operated by room temperature and the other by the temperature of the hot water, only one of which is operatively connected with the heating means at a time, the room temperature actuated control device being operatively connected with mechanism for disconnecting the circulating heating system from the boiler and simultaneously transferring the control of the heater to the control device actuated by the temperature of the hot water supply.

Another feature of my invention is the provision of means, independent of said controlling device, for preventing the temperature of the domestic hot water from rising above a desired predetermined point when the control device actuated by room temperature is in control of the heating means, and the circulating heat system is in connection with the boiler. This feature is equally applicable to steam and hot water circulating heating systems, and is particularly necessary in a steam heating system on account of the high temperature of the heating medium.

My invention comprises certain novel features of construction and combination of parts hereinafter fully disclosed and particularly pointed out in the claims.

In the accompanying drawings,

Fig. 1 is a diagrammatic representation of a hot water heating and hot water supplying system embodying my invention.

Fig. 2 is a detail view of a valve in the hot water supply portion of the system, shown in Fig. 1.

Fig. 3 is a partial view of the system illustrated in Fig. 1, showing a modification of the means for preventing the overheating of the domestic hot water.

Fig. 4 is a detail sectional view of the mixing valve, shown in Fig. 3.

Fig. 5 is a view of a portion of the system illustrated in Fig. 1, showing a further modification.

Fig. 6 is a view similar to Fig. 3, showing another modification of the same portion of the system.

Fig. 7 is a detail sectional view of a magnetically operable valve illustrated in Fig. 6.

Fig. 8 is a view similar to Fig. 3, showing an installation including the valve illustrated in Fig. 7.

Fig. 9 is a view similar to Fig. 3, showing another slight modification.

Referring to Fig. 1 of the drawings, 1 represents what I term the "boiler" in which the circulating fluid, which in this instance is water, is heated, by any suitable heating means, the fuel for which may be oil, gas, electricity, coal, or other preferred fuel. It will be understood that the heater will be capable of control in any usual or preferred manner appropriate to the fuel consumed. In the present instance the boiler is provided with an oil burner of any usual or desired type, containing an electric motor, indicated at 2, for operating the same. 3 represents the main riser for supplying the circulating heating medium, in this instance hot water, to which are connected the usual radiators or other heating units, one of which is shown at 4, provided with a return pipe, 5, it being understood that the return pipes of all the heating units will be connected with the return pipe, 6, connected in the usual manner with the lower portion of the boiler. In the main riser, 3, between the boiler and its connections with the heating units, 4, I provide a cut-off valve, indicated at 7, and a by-pass, 8, connecting the portions of the riser, 3, on opposite sides of the valve, 7, said by-pass being provided preferably with a hand adjustable restricting valve, indicated at 9, by which the capacity of the by-pass may be regulated. This by-pass serves the purpose of permitting a slight bleeding between the boiler and the exterior portions of the heating system when the main cut-off valve, 7, is closed, and also permits any air in the water, collecting at the top of the boiler and entering the riser, to pass through the by-pass when the valve, 7, is closed, and thence to the heating units from which it may escape through the ordinary relief valves, one of which is indicated at 10, on the radiator, 4, or through the usual expansion tank with which a hot water heating system is ordinarily provided.

The domestic hot water is heated through the agency of a heat exchange device or indirect heater from the heating medium in the boiler. This heat exchanging mechanism may be exterior to the boiler or immersed therein, as preferred. In Fig. 1, I have shown an exterior form of indirect heater comprising a drum or hollow body, 11, connected at its upper end with a pipe, 12, with the upper end of the boiler, in this instance through the riser, 3, and having its lower end connected by a pipe, 13, with the lower end of the boiler, as through the return pipe, 6. Within the drum or body, 11, is a coil, 14, the upper end of which is connected with a supply pipe, 15, and the lower end with a return pipe, 16. Where a tank or reservoir is employed, as indicated at 17 in Fig. 1, the supply pipe, 15, is connected with the upper portion of the tank, in this instance by means of a T connected with the tank at one end and with a hot water service pipe, 18, at the other end, leading to the faucets located at points where the hot water is to be used, and the return pipe, 16, is connected with the tank, 17, adjacent to its lower end, the tank being supplied with cold water by means of a pipe, 19, connected with the usual house water main or other source of supply. In this instance I have shown the coil, 14, provided with a bypass, 20, leading from an intermediate point between the ends of the coil to a controlling valve, 21, located in the return pipe, 16, and constructed in the usual manner indicated for example in Fig. 2. The valve proper, indicated at 22, is provided with a through passage, 23, for permitting the water in the return pipe, 16, to pass into the lower end of the coil, and having a branch passage, indicated at 24, so that by rotating the valve in the direction of the arrow in Fig. 2, the through connection may be cut off more or less, and the connection between the return pipe, 16, and the by-pass, 20, opened. This will permit part or all of the water from pipe, 16, to enter the coil at a point above the bottom of the same, and thereby receive less heat from the surrounding heating medium. I prefer to make the operation of this valve automatic by means of a device which will be responsive either to the heat of the domestic hot water or to the heat of the heating medium in the boiler. In this instance I have shown the upper part of the boiler provided with a thermostatic damper regulator, 25, for example, having a longitudinally expansible member, 26, subjected to the heating medium in the boiler, and bearing upwardly against a lever, 27, provided with an adjustable weight, 28, said lever, 27, being connected by a link, 29, with an arm, 30, connected to the rotary member, 22, of the valve, 21. The specific construction of this thermostatic regulating device forms no part of my invention and will not be more particularly described, as it is a construction in common use. It will be seen that upon the rise of the temperature of the water (or other heating medium) in the boiler above that for which the regulator, 25, is set, the valve, 21, will be operated to bypass a portion or all of the water in the return pipe, 16, through the upper end of the coil, 14, only, thereby preventing the water in the domestic hot water supply system from becoming too highly heated, which might otherwise result where the boiler, 1, is being operated at full capacity to supply heat.

It will be understood that the temperature of the hot water in the domestic hot water system will be controlled by direct regulation of the burner or burners, by a thermostatic means directly responsive to the temperature in the domestic hot water system, whenever the circulating heating system is cut off from the boiler, as hereinafter described, and therefore, the auxiliary thermostatic device, 25, and the water temperature regulating means which it controls, will only be brought into operation when the burners have been taken out of the control of the thermostatic means responsive to the temperature of the domestic hot water.

One of the greatest difficulties in the practical operation of heating systems, in which the domestic hot water supply is heated from the same heating source, is that regulation of the heater, by means responsive to the room temperature, will result in maintaining the domestic water supply at too high a temperature in cold weather and at too low a temperature in warm weather. On the other hand, regulation of the heater, by means responsive to the temperature of the domestic hot water, may readily interfere with the proper supply of heat by the heating system. Moreover, the amount of heat required for the domestic hot water system depends very largely upon the amount of hot water which is withdrawn therefrom. According to my invention, I provide a thermostatic control device, indicated at 31, responsive to room temperature for controlling the heater and for operating the valve, 7, to cut off the boiler from the exterior portions of the heating system when the desired room temperature has been attained, and simultaneously shifting the control of the heater to a second thermostatic device, indicated at 42, responsive to the temperature of the water in the domestic hot water supply, and in this instance located on the tank, 17, and having a portion extending into the water therein.

In Fig. 1, I have shown the valve, 7, provided with a motor, 43, for opening and closing the valve, the motor operated shaft, indicated at 44, being provided with a slotted arm, 45, adjustably connected by a link, 46, with an arm, 47, on the shaft, 7ª, of the rotary member of the valve, 7, and conveniently provided with a counterbalanced weight, indicated at 48. The motor, 43, is provided with any usual means, which need not be specifically described, for automatically breaking the motor circuit after the motor shaft, 44, has moved 180 degrees. The motor is shown connected in this instance by a two wire system with the house thermostat, 31, and associated with the motor is a relay illustrated diagrammatically in Fig. 1, and provided with fixed contacts, $a$, $b$, $c$ and $d$, and with pivoted blades or contacts, $e$, $f$ and $g$, said blades being connected for joint operation by a link, $h$, and one of the blades, as the blade, $e$, being provided with an armature, $i$. Adjacent to the armature, $i$, is an electromagnet, $j$, which becomes energized when the motor, 43, is operated to open the valve, 7, the relay magnet, $j$, thereupon shifting the movable contacts or blades, $e$, $f$, $g$, so as to disconnect the blade, $e$ from the contact, $d$, which it normally engages, and bringing the blades, $e$, $f$, $g$, respectively, into engagement with the contacts, $a$, $b$ and $c$. This effects the transfer of the control of the motor, 2, of the heating apparatus to the house thermostat, 31, and simultaneously closes a circuit through the motor of a hydrolator or pump, which is provided with a pumping member, indicated by dotted lines at 50, or in the return pipe, 6, leading to the boiler, 1, from the exterior portions of the house heating circulating system to increase the rapidity of circulation through said system. When the motor, 43, is operated by the thermostat, 31, to effect the closing of the valve, 7, to disconnect the exterior portions of the house heating circulating system from the boiler, the relay magnet, $j$, will be simultaneously de-energized, and the contacts, $e$, $f$, $g$, will be retracted by a spring, 51, so as to break the hydrolator circuit and simultaneously transferring the control of the motor, 2, of the heating apparatus to the thermostat, 42, responsive to the hot water temperature.

While I do not desire to be limited to the specific wiring arrangements herein shown, they will be described briefly for convenience of reference. For example, the thermostats may operate on either two wire or three wire circuits, but I have shown two wire circuits in Fig. 1. In this instance a wire, 52, extends from the room thermostat, 31, down to the magnet, $j$, of the relay, thence by wire, 52ª, to a wire, 53, connecting the motor, 43, with the wire, 54, connected with a movable contact, $k$, of the main switch, 55, to which the line wires, 56, 57, from the house current lines or other source of electrical supply are connected. The switch is shown provided with a second movable contact, $l$, connected with the contact, $k$, by a link or cross-bar, $m$, and a wire, indicated at 58, extends from the contact, $l$, to the thermostat, 31. The wire, 58, is connected by a wire, 59, with the contacts, $b$ and $c$, of the relay, and is also connected by a branch wire, 60, with the thermostat, 42, and by branch wire, 61, with the motor, 43. The thermostat, 42, is also connected by a wire, 62, with the movable contact, $f$, of the relay. The contact, $k$, of the main switch, 55, is connected by the wire, 54, with the motor, 2, of the heating mechanism, and said motor is connected by a wire, 63, with a boiler safety thermostatic control device, indicated at 64, and having its thermostatic element extending into the boiler adjacent to the upper portion of the same. The thermostat, 64, is connected by a wire, 65, with the wire, 62. A branch wire, 66, extends from the wire, 54, to the motor, 49, of the hydrolator, which is connected by a wire 67, with the movable contact, $g$, of the relay. The valve operating motor, 43, is controlled by the thermostat, 31, through the relay, and two motor circuits therefor extend from the relay to the motor, which is provided with the usual or any preferred form of circuit changing device (not shown), by which one of the circuits is broken and the other closed at each half revolution of the motor actuated shaft, 44. A wire, 68, extends from a binding post, $n$, on the motor housing to the contact, $a$, of the relay, a second wire extends from the binding post, $o$, on the motor housing to the contact, $d$, of the relay, and a common wire, 70, extends from the binding post, $p$, on the motor housing to the blade or contact, $e$, of the relay. The switching of the blade, $e$, to the left in Fig. 1, will obviously break the circuit through wires, 69 and 70, and close the circuit through the wires, 68 and 70, and the movement of the blade, $e$, in the opposite direction will break the circuit through wire, 68, and close the circuit through wire, 69, in a well known way. The circuit changing device operated by the motor is so well known that it is not shown or particularly described herein.

The operation of the apparatus heretofore described will be as follows. Assuming that the main switch, 55, is closed, that the motor, 2, of the heating apparatus is operating so as to fire the furnace, and the valve, 7, is in closed position, cutting off the boiler from the exterior portions of the circulating heating system, it may be assumed that both thermostats, 31 and 42, have their contacts separated, and the relay is in the position shown in Fig. 1. In this position of the apparatus the boiler is only furnishing heat for the purpose of heating the domestic hot water supply, the water in the boiler being circulated through pipe, 12, heating drum, 11, and return pipe, 13, past the coil, 14, through which the domestic hot water passes. The motor, 2, is in this position of the parts under the control of the thermostat, 42. For convenience, let it be supposed that it is desired to maintain the water in the domestic hot water supply system at approximately 135 degrees F., and that for the purpose of heating the house properly, it is desirable that the hot water in the boiler shall be heated to a temperature of approximately 165 degrees. It is obvious that a control of the heating apparatus based on the temperature of the hot water in the supply system would interfere with the efficiency in the house heating system, and that a control of the heating apparatus based on the temperature of the boiler water would result in heating the hot water above a desirable temperature.

In the system shown in Fig. 1, upon the assumptions heretofore made, the hot water supply will be maintained at the desired temperature by the thermostat, 42, which will stop the motor and cut off the heat from the boiler whenever the hot water in the tank, 17, reaches, 135 degrees F., and will start the motor to supply heat to the furnace whenever the temperature of the hot water in the tank, 17, falls below that temperature. The thermostat, 42, will act quite independently of the temperature of the water in the boiler. For example, if large demands were being made on the hot water supply system and corresponding amounts of cold water were being admitted, a much higher temperature might be required in the boiler water than would be required if very little hot water were being drawn off from the hot water supply system. By locating the controlling thermostat, 42, for the heating apparatus in the hot water supply, as in the tank, 17, it is directly responsive to the actual temperature of the hot water to be supplied by that system. It will be understood that should the thermostat, 42, for any reason fail to operate to shut off the heating apparatus so that the water in the boiler rises to a higher temperature than necessary, the thermostatic control device, 25, located on the boiler and responsive to boiler temperature, would be called into operation, raising the arm, 27, and operating the valve, 21, so as to shut off a part or all of the water in the circulating domestic hot water system, through the by-pass, 20, so that it will not receive so much heat from the boiler water, thus preventing the overheating of the domestic hot water. The boiler safety thermostat, 64, which is always in circuit with the motor, 2, will also act in an emergency to shut off the motor before the boiler water can reach a dangerous temperature.

If now we further assume that the apparatus to be heated by the heating system has cooled sufficiently to operate the house thermostat and close the circuit through the wires, 52 and 58, it will be noted that the relay magnet, $j$, will be energized, thereby moving the contact, $e$, so as to disengage the fixed contact, $d$, and engage the fixed contact, $a$, and simultaneously the movable contacts, $f$ and $g$, will be brought respectively into engagement with the fixed contacts, $b$ and $c$. As the movable contact, $e$, of the relay engages the fixed contact, $a$, the motor, 43, will be operated so as to rotate the shaft, 44, through 180 degrees, and move the valve, 7, into open position. The half rotation of the shaft, 44, will, in a well known way, cut out the motor circuit through wires, 68 and 70, and close the motor circuit through lines, 69 and 70.

The opening of the valve, 7, connects the boiler with the upper portion of the riser, 3, leading to the exterior portions of the circulating heating system, and simultaneously the closing of the circuit through contacts, $g$ and $c$, will close the circuit through the hydrolator, 49, if a hydrolator is employed, thus insuring rapid circulation of the water in the circulating heating system. At the same time the closing of the circuit through contacts, $f$ and $b$, short circuits the thermostat, 42, and closes the circuit through the motor, 2, which will be started if it has been previously cut out of operation by the thermostat, 42, or will continue in operation if it was operating at the same time the room thermostat, 31, assumes control. The heating apparatus will now be operated to furnish as its main function, heat for the circulating heating system, while at the same time continuing to furnish heat to the domestic hot water supply, and obviously the temperature of the water in the boiler may and frequently will rise much higher than would be necessary or desirable for the heating of the hot water supply. As the temperature of the water in the boiler rises, the thermostatic control device, 25, which is responsive to boiler temperature, will operate the valve, 21, in the manner previously described, so as to shunt a portion or all of the water from the return pipe, 16, of the hot water supply, through the by-pass, 20, so that it will receive less heat from the boiler water in the drum, 11, thus preventing the overheating of the hot water supply when the boiler is being used for furnishing heat to the radiators. It will also be seen that the boiler safety thermostat, 64, will be called into operation, if necessary, to prevent the possibility of the temperature of the boiler water reaching a dangerous or undesirable point due to the failure of the house thermostat or otherwise.

When the room temperature to which the thermostat, 31, is responsive rises to the point desired, the thermostat will act to break the circuit through the relay magnet, *j*. This permits the movable contacts, *e*, *f*, *g*, to be moved out of engagement with the fixed contacts, *a*, *b*, *c*, and moves the contact, *e*, again into engagement with the fixed contact, *d*. This closes the circuit through wires, 69 and 70, to the motor, 43, and actuates the motor to close the valve, 7, and cut off the exterior portion of the circulating heating system from the boiler, said motor circuit being thereby broken and the motor circuit closed through wires, 68 and 70, which circuit, however, is opened at the fixed contact, *a*. The movement of the movable contact, *g*, away from fixed contact, *c*, simultaneously breaks the circuit through the hydrolator if the same is employed, and the separation of contacts, *f* and *b*, restores the thermostat, 42, responsive to the temperature of the domestic hot water supply to the control of the motor, 2, and breaking the motor circuit through contacts, *b* and *f*. Thereafter and until the next operation of thermostat 31, motor, 2, will be directly controlled by the thermostat, 42, and the parts will be in the position illustrated in Fig. 1 and obviously the auxiliary thermostat, 25, will not operate except in case of failure of the thermostat 42.

The hydrolator, 49, may or may not be used. If it is not employed, the relay contacts, *g* and *c*, and the wires, 66 and 67, will be omitted.

For simplicity, I have ignored in the diagram Fig. 1, the fact that certain of the circuits may, if desired, carry a higher voltage than others. For example, it is customary to employ a low voltage, not exceeding twenty volts, in the thermostatic circuit, and to employ a higher voltage circuit, as 120 volts, for operating the motor which controls the heating apparatus. This is common practice and can be readily accomplished where desired, by the use of a suitable transformer, (not shown) or the entire apparatus may operate upon the same voltage if the motors are properly wound to operate on a voltage suitable for the thermostatic circuits.

In the system previously described, I have shown the thermostat, 25, for preventing the overheating of the domestic hot water arranged in the boiler and responsive to boiler water temperature. In some instances I prefer, however, to control the temperature of the domestic hot water against overheating, when the thermostat, 42, is cut out of circuit, or in case it should fail to act, by means directly responsive to the actual temperature of the hot water supply. In Fig. 3 for example, I have shown a modification of this portion of the apparatus illustrated in Fig. 1, in which corresponding parts have been given the same reference characters with the addition of 100. In this instance I have shown the pipe, 115, leading from the indirect heating apparatus for the hot water supply, provided with a T at 115ª, supporting the thermostatic device, 125, so that the thermostatic element, 126, thereof extends into the hot water delivered to the hot water supply system. The weighted arm, 127, of the thermostatic device, 125, may be connected with the rotary portion of a valve similar to that shown at 21 in Figs. 1 and 2, if desired, in which case the operation would be exactly the same as that previously described, except that the device, 125, would be responsive to the actual temperature of the water leaving the indirect domestic hot water heater. Such a construction I have illustrated in Fig. 9. In Fig. 3, however, I have shown the arm, 127, connected by link, 129, with an arm, 130, for operating a rotary valve member 122, of a mixing valve 121, the construction of which is illustrated in detail in Fig. 4. This mixing valve, 121, is provided with an inlet 121ª, communicating directly with the indirect heater, a secondary inlet, 121ᵇ, communicating with a cold water supply pipe, 119ª, connected with the house service main or other source of supply, and said valve casing is provided with an outlet aperture, 121ᶜ, which is connected with the pipe, 115, between the indirect heater and the thermostatic control device, 125.

The rotary valve member, at 122, is provided with an interior passage, 122ª, which normally connects the hot water inlet aperture, 121ª, with the outlet aperture, 121ᶜ, and the valve is so constructed that when rotated in the direction of the arrow Fig. 4, it will gradually cut off the supply of hot water and correspondingly open communication with the supply of cold water at 121ᵇ, so that the water leaving through the inlet, 121ᶜ, will be tempered in proportion to the opening of the valve. The valve member, 122, is also provided with an auxiliary aperture, 122ᵇ, adapted to be brought into registration with the hot water inlet aperture, 121ª, in case the valve is moved far enough to completely open the cold water inlet, 121ᵇ, so that the communication between the outlet, 121ᶜ, and the hot water inlet, 121ª, can never be completely closed. With this construction it will be seen that the temperature of the hot water supply will be regulated entirely independently of variations in temperature of the boiler water and cannot rise above the temperature for which the thermostatic device, 125, is set.

The construction illustrated in Fig. 5 is also readily adaptable to domestic hot water heating means of the emersion type, in which the coil is inserted or immersed in the boiler in contact with the heating medium.

I have illustrated such a construction in Fig. 5, in which parts corresponding with those shown in Figs. 1 and 2 are given the same reference numerals with the addition of 200. As illustrated in Fig. 5, the heating coil, 214, is located within the boiler, the inlet pipe being indicated at 216, and the outlet pipe at 215. The outlet pipe, 215, is shown provided with the mixing valve, indicated at 221, and constructed as indicated in Fig. 4, and the pipe, 215, is also provided with the thermostatic regulating device, 225, having its arm, 227, connected by link, 229, with the valve actuating arm, 230, of the valve, 221. The water inlet pipe, 216, is preferably provided with a check valve, indicated at 216ª, to prevent the water from leaving the coil through the pipe, 216, and in this arrangement the auxiliary aperture of the mixing valve, indicated at 122ª in Fig. 4, serves an additional function in preventing the possibility of trapping the water in the coil, 214, which might otherwise occur when the cold water inlet of the valve, indicated at 121ᵇ, in Fig. 4 is fully opened.

In Fig. 6, I have illustrated another arrangement for preventing the overheating of the domestic hot water, in this instance by restricting or cutting off to a greater or less extent the supply of the heating medium from the boiler to the indirect water heating means. In this figure the parts corresponding with those shown in Figs. 1 and 2 are given the same reference numerals with the addition of 300. In this construction one of the pipes connects the drum, 311, with the boiler, for example, and the return pipe, 313, is provided with a regulating valve, indicated at 321, the rotary member of which is provided with an operating arm, 330. The thermostatic control device, represented at 325, is mounted upon a T at 315ª, in the pipe, 315, which conducts the hot water from the indirect heater, and the arm, 327, of the thermostatic device is connected by link, 329, with the arm, 330, of the regulating valve in such a manner that as the temperature of the hot water delivered to the hot water supply approaches a critical temperature, the arm, 327, will be raised in a direction to close the regulating valve, 321, thus restricting more or less of the heating medium between the boiler and the indirect heater, and if necessary cutting it off completely. I prefer, however, to employ a cut-off valve which is incapable of being entirely closed, so that in its most nearly closed position there will yet be a slight passage of the heating medium thereby. By this means the thermostat, 325, which is directly responsive for the temperature of the water leaving the indirect heater, is regulated to prevent its rising above a predetermined temperature.

Instead of employing a cut-off valve, which is mechanically operated by a thermostatic device of the kind shown in the preceding figures, I may employ a magnetically operated valve such as is illustrated for example in Fig. 7, in which the parts corresponding with those shown in Figs. 1 and 2 are given the same reference numerals with the addition of 400. As shown in Fig. 7, the valve casing, 421, which is inserted in the pipe, 413, leading from the indirect heater to the boiler, is provided with a solenoid, 430, for operating a core, 422ª, the lower end of which carries the tapering valve, 422, engaging a valve seat, 422ᵇ, an adjusting screw, 422ᶜ, being provided for engaging the valve and preventing the complete seating thereof, as shown in Fig. 7.

In Fig. 8 I have shown the valve illustrated in Fig. 7, arranged in the system in the same manner as the valve, 321, in Fig. 6, but in this instance the thermostatic device illustrated at 425, will be of the type shown for example at 42 in Fig. 1, and will be supported on a T at 415ª, in the hot water pipe, 415, and electrically connected in the usual manner with the solenoid, 430. The operation will be substantially the same as that described with reference to Fig. 6.

In Fig. 9 I have illustrated the modification previously described in connection with Fig. 3, in which the construction is identical with Fig. 1, except that the thermostat which controls the temperature of the hot water supply is directly responsive to the temperature of the water as it leaves the indirect heater. In this figure the parts corresponding with those in Figs. 1 and 2 are given the same reference numerals with the addition of 500. As illustrated in this figure the pipe, 515, is provided with a T, 515ª, in one outlet of which is mounted the thermostatic control device, 525. The return pipe, 516, of the hot water supply system is provided with the switch valve, 521, of the type shown in Fig. 2, and connected by a by-pass, 520, with a portion of the coil intermediate the ends thereof. The arm, 527, of the thermostatic control device is connected with the arm, 530, of valve, 521, by a link, 529, and the operation is exactly the same as that described with reference to Figs. 1 and 2, except that the control of the by-pass, 520, which regulates the temperature of the hot water supply, is regulated directly by the temperature of the hot water leaving the coil of the indirect heater and is independent of the temperature of the boiler water.

Which I have described my invention as applied to a hot water circulating heating system, I do not wish to be limited thereto, and I desire to have it particularly understood that the features of my invention which relate to the control of the temperature of the domestic hot water supply, to prevent overheating when the system is operating to circulate the heating medium through the exterior portions of the circulating heating system, are applicable equally to steam and hot water systems.

It will be seen that my invention as hereinbefore described and particularly set forth in the following claims presents a heating and hot water supply system which will operate automatically at all times of the year without the necessity of exercising any manual control or employing any other type of control than the room thermostat, the domestic hot water control and the boiler safety control. Obviously, in the summer time when no heat is required in the rooms, the temperature of which is controlled by the room thermostat, the apparatus will function indefinitely and automatically to supply domestic hot water under the automatic control of the apparatus previously described by which the temperature of the domestic hot water is maintained substantially uniform and at the desired degree. With the approach of cold weather, when the temperature of the rooms to be heated falls below that for which the room thermostat is set, the circulating heating system will be automatically brought into operation for such time or times as is necessary to raise the room temperature to that for which the room thermostat is set, during which time the control of the heater will be transferred to the room thermostat. In other words, during the season when heating is required for the rooms, the circulating heating system will be automatically cut in and cut out intermittently to maintain the desired room temperature, and during the season when no heat is required, the circulating heating system is automatically cut out and remains inoperative until the lowering of the room temperature again calls for its operation. During the entire year the apparatus will operate automatically to supply domestic hot water at the required temperature, and the safety boiler control acts as a sentinel to prevent the possibility of a dangerous situation arising at any time, whether the apparatus is furnishing hot water alone, or is furnishing both heat and hot water.

What I claim and desire to secure by Letters Patent is:—

1. In a heating apparatus, the combination with a boiler, a burner therefor, a heating system connected with the boiler, valve means for controlling said connection, and a hot water supply system deriving its heat from the boiler independently of said heating system, of thermostatic means responsive to the temperature of the water in said hot water system, for controlling said burner, separate thermostatic means responsive to room temperature for controlling said burner, and means for transferring the control of the burner from one of said thermostatic devices to the other when the valve means are moved to closed and to open position.

2. In a heating apparatus, the combination with a boiler, a burner therefor, a heating system connected with the boiler, valve means for controlling said connection, and a hot water supply system deriving its heat from the boiler independently of said heating system, of thermostatic means responsive to the temperature of the water in said hot water system, for controlling said burner, separate thermostatic means responsive to room temperature for controlling said burner, and means controlled by the last mentioned thermostatic means for operating said valve and simultaneously transferring the control of said burner from one of said thermostatic means to the other.

3. In a heating apparatus, the combination with a boiler, a burner therefor, a heating system connected with the boiler, valve means for controlling said connection, and a hot water supply system deriving its heat from the boiler independently of said heating system, of thermostatic means responsive to the temperature of the water in said hot water system, for controlling said burner, when said valve means are in position to disconnect said heating system from the boiler, and thermostatic means responsive to room temperature for controlling said burner when said valve means are in position to connect said heating system with the boiler.

4. In a heating apparatus, the combination with a boiler, a burner therefor, a heating system connected with the boiler, valve means for controlling said connection, and a hot water supply system deriving its heat from the boiler independently of said heating system, of thermostatic means responsive to the temperature of the water in said hot water system, for controlling said burner, when said valve means are in position to disconnect said heating system from the boiler, and thermostatic means responsive to room temperature for controlling said burner when said valve means are in position to connect said heating system with the boiler, and means operated by the last mentioned thermostatic means for operating said valve and simultaneously transferring the control of said burner from one of said thermostatic means to the other.

5. In a heating apparatus, the combination with a boiler, a burner therefor, a heating system connected with the boiler, valve means for controlling said connection, and a hot water supply system deriving its heat from the boiler independently of said heating system, of thermostatic means responsive to the temperature of the water in said hot water system, for controlling said burner, when said valve means are in position to disconnect said heating system from the boiler, thermostatic means responsive to room temperature for controlling said burner, valve actuating means controlled by said last mentioned thermostatic means, and circuit controlling mechanism for transferring the control of the burner from one thermostat to the other, operated by said last mentioned thermostatic means.

6. In a heating apparatus, the combination with a boiler, a burner therefor, a heating system connected with the boiler, valve means for controlling said connection, and a hot water supply system deriving its heat from the boiler independently of said heating system, of thermostatic means responsive to the temperature of the water in said hot water system, for controlling said burner, separate thermostatic means responsive to room temperature for controlling said burner, and means for transferring the control of the burner from one of said thermostatic devices to the other when the valve means are moved to closed and to open position, and a bleeder by-pass for connecting the boiler with the heating system independently of said valve.

7. In a heating apparatus, the combination with a boiler, a burner therefor, a heating system connected with the boiler, valve means for controlling said connection, and a hot water supply system deriving its heat from the boiler independently of said heating system, of thermostatic means responsive to the temperature of the water in said hot water system, for controlling said burner, separate thermostatic means responsive to room temperature for controlling said burner, and means for transferring the control of the burner from one of said thermostatic devices to the other when the valve means are moved to closed and to open position, a bleeder by-pass for connecting the boiler with the heating system independently of said valve, and an adjustable restricting valve in said by-pass.

8. In a heating apparatus, the combination with a boiler, a burner therefor, a motor for said burner, a heating system connected with the boiler, valve means for controlling said connection, a motor for operating said valve, and a hot water supply system deriving its heat from the boiler independently of said heating system, of thermostatic means responsive to the temperature of the water in said hot water system, for controlling said burner when said valve means are in position to disconnect the heating system from the boiler, thermostatic means responsive to room temperature for controlling said burner when said valve means are in position to connect the heating system with the boiler, said last mentioned thermostat being connected with the valve actuating motor, and a relay having an actuating magnet connected with said last mentioned thermostat, and operatively connected with the burner motor and with the first mentioned thermostatic means for transferring the control of the burner motor from one thermostatic means to the other.

9. In a heating apparatus, the combination with a boiler, a burner therefor, a motor for said burner, a heating system connected with the boiler, valve means for controlling said connection, a motor for operating said valve, and a hot water supply system deriving its heat from the boiler independently of said heating system, of thermostatic means responsive to the temperature of the water in said hot water system, for controlling said burner when said valve means are in position to disconnect the heating system from the boiler, thermostatic means responsive to room temperature for controlling said burner when said valve means are in position to connect the heating system with the boiler, said last mentioned thermostat being connected with the valve actuating motor, means in the heating system for promoting circulation of the heating medium, a circuit control mechanism operated by the last mentioned thermostatic means for transferring the control of the motor burner from one of the thermostatic means to the other, and for controlling the circuit through the motor for the circulation promoting means.

10. In a heating apparatus, the combination with a boiler, a burner therefor, a motor for said burner, a heating system connected with the boiler, valve means for controlling said connection, a motor for operating said valve, and a hot water supply system deriving its heat from the boiler independently of said heating system, of thermostatic means responsive to the temperature of the water in said hot water system, for controlling said burner when said valve means are in position to disconnect the heating system from the boiler, thermostatic means responsive to room temperature for controlling said burner when said valve means are in position to connect the heating system with the boiler, means for promoting the circulation in the heating system, an operating motor therefor, and a relay having an operating magnet in the circuit to the last mentioned thermostatic means, and electrical connections in circuit with the burner motor, the motor for said circulation promoting means and said second mentioned thermostatic means, and controlled by said relay for transferring the control of the burner motor from one thermostatic means to the other, and simultaneously controlling the motor of the circulation promoting means.

11. In a heating apparatus, the combination with a boiler, a burner therefor, a heating system connected with the boiler, valve means for controlling said connection, and a hot water supply system deriving its heat from the boiler independently of said heating system, of thermostatic means responsive to the temperature of the water in said hot water system, for controlling said burner, separate thermostatic means responsive to room temperature for controlling said burner, and means for transferring the control of the burner from one of said thermostatic devices to the other when the valve means are moved to closed and to open position, and a boiler safety control responsive to the temperature of the heating medium in the boiler, in circuit with both of said thermostatic means.

12. In a heating apparatus, the combination with a boiler, a burner therefor, a heating system connected with the boiler, valve means for controlling said connection, and a hot water supply system deriving its heat from the boiler independently of said heating system, of thermostatic means responsive to the temperature of the water in said hot water system, for controlling said burner, separate thermostatic means responsive to room temperature for controlling said burner, and means for transferring the control of the burner from one of said thermostatic devices to the other when the valve means are moved to closed and to open position, means operated by said last mentioned thermostatic means, for operating said valve and simultaneously transferring the control of the burner from one of the thermostatic means to the other, and a boiler safety control responsive to the temperature of the heating medium in the boiler, in circuit with both of said thermostatic means.

In testimony whereof I affix my signature.

HARRY E. LAKE.

to the temperature of the water in said hot water system, for controlling said burner, separate thermostatic means responsive to room temperature for controlling said burner, and means for transferring the control of the burner from one of said thermostatic devices to the other when the valve means are moved to closed and to open position, and a boiler safety control responsive to the temperature of the heating medium in the boiler, in circuit with both of said thermostatic means.

12. In a heating apparatus, the combination with a boiler, a burner therefor, a heating system connected with the boiler, valve means for controlling said connection, and a hot water supply system deriving its heat from the boiler independently of said heating system, of thermostatic means responsive to the temperature of the water in said hot water system, for controlling said burner, separate thermostatic means responsive to room temperature for controlling said burner, and means for transferring the control of the burner from one of said thermostatic devices to the other when the valve means are moved to closed and to open position, means operated by said last mentioned thermostatic means, for operating said valve and simultaneously transferring the control of the burner from one of the thermostatic means to the other, and a boiler safety control responsive to the temperature of the heating medium in the boiler, in circuit with both of said thermostatic means.

In testimony whereof I affix my signature.

HARRY E. LAKE.

CERTIFICATE OF CORRECTION.

Patent No. 1,843,566.      Granted February 2, 1932, to

HARRY E. LAKE.

It is hereby certified that the name of the assignee in the above numbered patent was erroneously described and specified as "Preferred Utilities Manufacturies Corporation", whereas said name should have been described and specified as Preferred Utilities Manufacturing Corporation, as shown by the records of assignments in this office; and that the said Letters Patent should be read with this correction therein that the same may conform to the record of the case in the Patent Office.

Signed and sealed this 22nd day of March, A. D. 1932.

(Seal)

M. J. Moore,
Acting Commissioner of Patents.

CERTIFICATE OF CORRECTION.

Patent No. 1,843,566. Granted February 2, 1932, to

HARRY E. LAKE.

It is hereby certified that the name of the assignee in the above numbered patent was erroneously described and specified as "Preferred Utilities Manufacturies Corporation", whereas said name should have been described and specified as Preferred Utilities Manufacturing Corporation, as shown by the records of assignments in this office; and that the said Letters Patent should be read with this correction therein that the same may conform to the record of the case in the Patent Office.

Signed and sealed this 22nd day of March, A. D. 1932.

(Seal)

M. J. Moore,
Acting Commissioner of Patents.